United States Patent
Mylavarapu

(10) Patent No.: US 12,375,395 B2
(45) Date of Patent: Jul. 29, 2025

(54) PREDICTIVE MONITOR FOR REGION-SWITCHING EVENTS BETWEEN INTER-CONNECTED COMPUTER SYSTEMS

(71) Applicant: Capital One Services, LLC, McLean, VA (US)

(72) Inventor: Teja Swaroop Mylavarapu, McLean, VA (US)

(73) Assignee: Capital One Services, LLC, McLean, VA (US)

(*) Notice: Subject to any disclaimer, the term of this patent is extended or adjusted under 35 U.S.C. 154(b) by 27 days.

(21) Appl. No.: 18/407,008

(22) Filed: Jan. 8, 2024

(65) Prior Publication Data

US 2025/0227058 A1 Jul. 10, 2025

(51) Int. Cl.
*H04L 45/28* (2022.01)
*H04L 43/12* (2022.01)
*H04L 45/302* (2022.01)

(52) U.S. Cl.
CPC .............. *H04L 45/28* (2013.01); *H04L 43/12* (2013.01); *H04L 45/3065* (2013.01)

(58) Field of Classification Search
None
See application file for complete search history.

(56) References Cited

U.S. PATENT DOCUMENTS 12,010,007 B1 * 6/2024 Wallace ................ H04L 43/16
2021/0316178 A1 * 10/2021 Hong ................. A62C 35/026
2023/0318947 A1 * 10/2023 Janakiraman ........... H04L 43/12
709/224

OTHER PUBLICATIONS

Liu, Ping, et al., "Meta Knowledge Condensation for Federated Learning", ArXiv, Sep. 29, 2022, 14 pages. https://arxiv.org/abs/2209.14851.

* cited by examiner

*Primary Examiner* — Fadi Haj Said
(74) *Attorney, Agent, or Firm* — Foley & Lardner LLP

(57) ABSTRACT

A method and related system for application resilience by proactively switching data center regions based on detected failures in shared intermittent components by determining shared components of a first data center region based on monitoring data associated with a set of deployed applications with or without requiring the occurrence of active traffic. The method includes determining an intermittent component of the shared components based on the monitoring data and an activity gap threshold. The method further includes probing the intermittent component, obtaining a set of responses from the intermittent component, and determining a combined resource value based on performance data associated with the set of deployed applications. The method further includes, in response to a determination that the set of responses satisfies a set of region-switching criteria, provisioning a second set of infrastructure resources of a second data center region based on the combined resource value.

20 Claims, 4 Drawing Sheets

PREDICTIVE MONITOR FOR REGION-SWITCHING EVENTS BETWEEN INTER-CONNECTED COMPUTER SYSTEMS

SUMMARY

In the field of cloud computing and web applications, the failures of devices, services, and other components are an inevitability. Such failures may have various types of causes, such as a physical device failure, a service outage, or malicious activity. In many cases, these failures may trigger a failover event, where applications or data related to applications may be switched to a different set of computing resources. However, in many cases, the occurrence of a failure sufficient to cause a failover event to switch the data center zones used by an application will also be sufficient to cause application failures that can be seen by end users of the application. In minor cases, such application failures may lead to user frustration and a reduced interest in future use of the application. In major cases, such application failures may result in a loss of critical data or one or more regulatory failures. Furthermore, in complex cloud computing architecture, multiple applications may share infrastructure components, where the piecemeal failover of an application can result in severe over-allocation of resources in a destination data center region.

Some embodiments may overcome the technical issue described above by proactively switching data center regions based on detected failures in shared intermittent components. Some embodiments may determine a set of shared components of a first data center region by analyzing monitoring data for multiple deployed applications and detecting the same identifier for different deployed applications, where a set of deployed applications is executing on the set of shared components. When a new component with the same name is identified, some embodiments may update a list of shared components to include the new component's identifier. Some embodiments may then determine a set of intermittent components associated with the set of shared components, e.g., by being in communication with the set of shared components or by being one or more of the set of shared components. When determining an intermittent component, some embodiments may analyze monitoring data to detect activity gaps for a component that exceeds an activity gap threshold. Some embodiments may then probe the set of intermittent components with a set of probing messages to obtain a set of responses from the set of intermittent components associated with the set of probing messages. By probing intermittent values, some embodiments may detect failures in weak points that would be missed in passive scans of a distributed computing environment and reduce the risk of a client-detected failure event by finding data that would cause a proactive switch to a new data center region.

Additionally, some embodiments may determine a combined resource value based on performance data associated with the set of deployed applications. For example, some embodiments may obtain a combined amount of CPU resources for an infrastructure component that is to be shared between multiple applications. Some embodiments may then determine whether the set of responses satisfies a set of region-switching criteria by providing the set of responses to a prediction model. The prediction model outputs one or more predictions. In response to a determination that the set of responses satisfies the set of region-switching criteria, some embodiments may provision a second set of infrastructure resources of a second data center region based on the combined resource value. For example, some embodiments may determine that the set of responses satisfies the set of region-switching criteria if predictions generated from using the set of responses as an input satisfies the set of region-switching criteria. By performing such operations, embodiments described in this disclosure may increase applications resilience of application groups by switching data center regions based on detected failures of intermittent components, where such switches are more likely to occur before a client-side device provides an error message.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
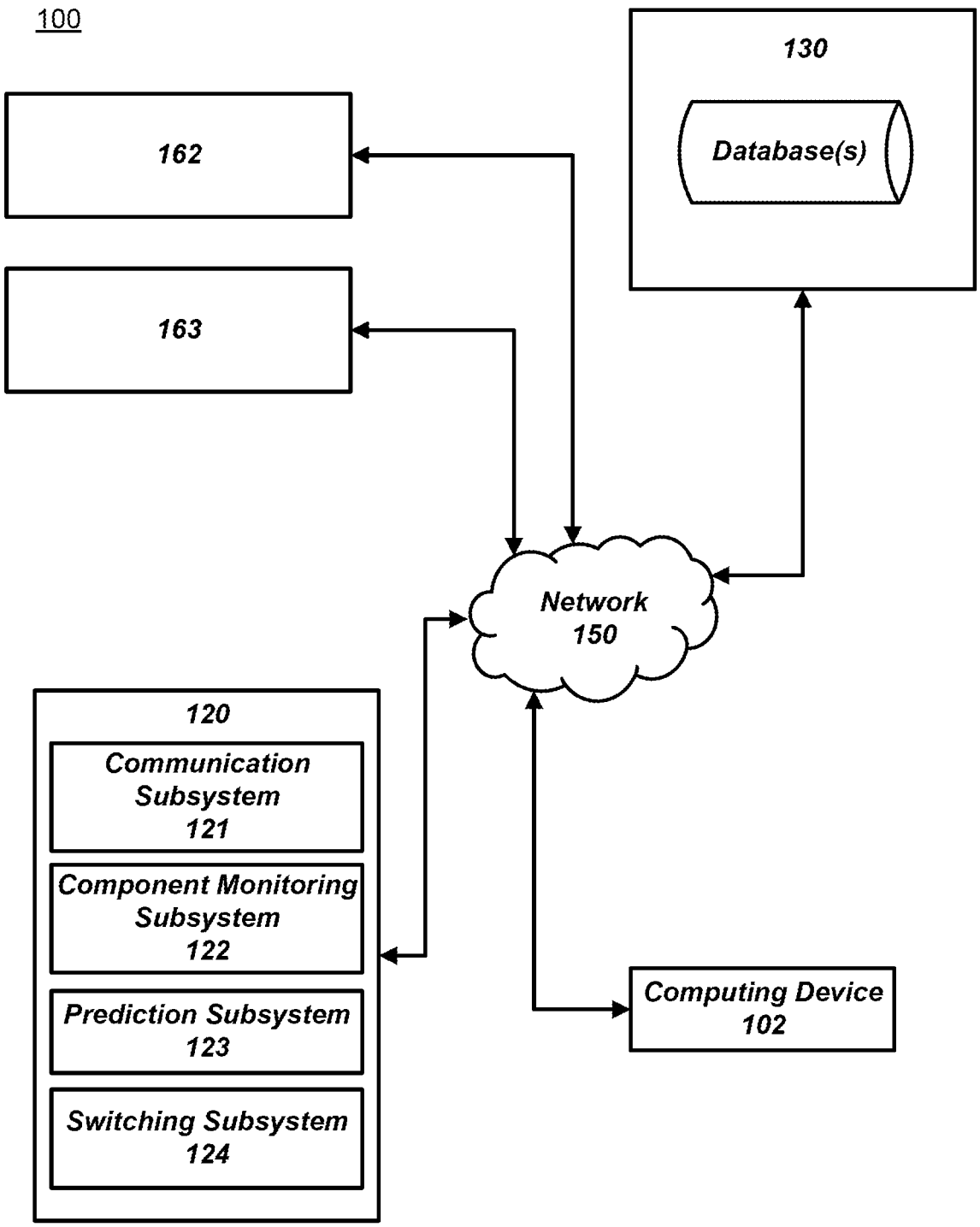
FIG. 1 illustrates a system for monitoring and initiating a region switch based on monitoring results, in accordance with some embodiments.

FIG. 1 illustrates a system for proactively initiating a region switch, in accordance with some embodiments. The system 100 includes a computing device 102. The computing device 102 may include computing devices such as a desktop computer, a laptop computer, a wearable headset, a smartwatch, another type of mobile computing device, a transaction device, etc. In some embodiments, the computing device 102 may communicate with various other computing devices via a network 150, where the network 150 may include the internet, a local area network, a peer-to-peer network, etc. The computing device 102 may send and receive messages through the network 150 to communicate with a first set of servers 120 within a first data center region, where the first set of servers 120 may include a set of non-transitory storage media storing program instructions to perform one or more operations of subsystems 121-124. The network 150 may also permit communication with a second set of servers 162 representing a second data center region and a third set of servers 163 representing a third data center region.

While one or more operations are described herein as being performed by particular components of the system 100, those operations may be performed by other components of the system 100 in some embodiments. For example, one or more operations described in this disclosure as being performed by the first set of servers 120 may instead be performed by the computing device 102. Furthermore, some embodiments may communicate with an application programming interface (API) of a third-party service via the network 150 to perform various operations disclosed herein. For example, some embodiments may provide device health data to an API and receive, in response, a probability score indicating a likelihood that a device will fail in a target time period.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of databases 130 may store messages from infrastructure components, identifiers and other information related to data center regions or data center zones in the data center regions, machine learning model parameters, etc.

In some embodiments, a communication subsystem 121 may send data to or receive data from various types of information sources or data-sending devices, including the computing device 102. For example, the communication subsystem 121 may receive response messages from the set of components.

In some embodiments, a component monitoring subsystem 122 may monitor infrastructure components and devices in communication with the infrastructure components. The component monitoring subsystem 122 may also detect one or more sets of infrastructure resources are shared amongst multiple deployed applications and label the set of deployed applications that shares a set of infrastructure resources with a group identifier. Some embodiments may then determine, as an identified cluster of components and devices, the components.

The component monitoring subsystem 122 may also identify one or more intermittent components of the identified cluster of components based on activity gaps representing pauses in detected activity from the intermittent components. It should be understood that the intermittent components, as part of the identified cluster of components, would be in communication with the set of shared infrastructure components that is shared by multiple applications. Some embodiments may then use the component monitoring subsystem 122 to probe the set of intermittent components to obtain a set of response messages indicating the health, functionality, or status of the set of intermittent components. The component monitoring subsystem 122 may collect these response messages as well as other messages indicating the health of other infrastructure components for prediction generation or operations to determine whether or not to perform other actions.

In some embodiments, a prediction subsystem 123 may determine a prediction based on data collected by the component monitoring subsystem 122. For example, the prediction subsystem 123 may provide, to a neural network model, component health data collected by the prediction subsystem 123. The prediction model may output a set of predictions indicating a likelihood of a system failure, such as a latency failure indicating a predicted inability to satisfy a latency requirement for an application or a resource availability failure indicating a predicted inability to satisfy one or more application-required resource requirements. Furthermore, the prediction subsystem 123 may use client device information from the computing device 102 indicating a device failure or a communication failure. Various other types of failures may be predicted by the prediction subsystem 123. For example, the prediction subsystem 123 can predict the likelihood of network outages, server connectivity issues, firewall-related issues, etc.

Some embodiments may use client device failures when predicting the likelihood of an infrastructure failure that would require a region-switching operation. For example, after the communication subsystem 121 obtains client device information from the computing device 102 or otherwise obtains an indication that the computing device 102 is not communicating, the prediction subsystem 123 may provide this set of client-device-related information to a prediction model. The prediction model may group the indications of client device failure with geographical information to determine the likelihood that a weather event or other type of event is within the vicinity of the data center region.

In some embodiments, a switching subsystem 124 may perform region-switching operations to transfer network traffic originally destined for the first data center region to a second data center region represented by the second set of servers 162. For example, some embodiments may first determine a combined resource value for a first resource type, where the combined resource value indicates, from an amount of a resource of the first resource type, that multiple applications are sharing one or more resources. Some embodiments may then determine a parameter representing the amount of the first resource type to provision based on the combined resource value (e.g., using the combined resource value as the exact amount, adding to the combined resource value, multiplying the combined resource value by a scaling factor). Some embodiments may then provision resources based on the parameter in the second data center region. By performing a region-switching operation, some embodiments may increase grouped application resilience. The detected failures of smaller components that individually would not have triggered a switch to a new data center region may be used to collectively cause a region switch. By causing a region switch before a system-wide failure event for a system can occur, some embodiments may reduce the risk of an application failure for applications hosted on that system.

Figure 2:
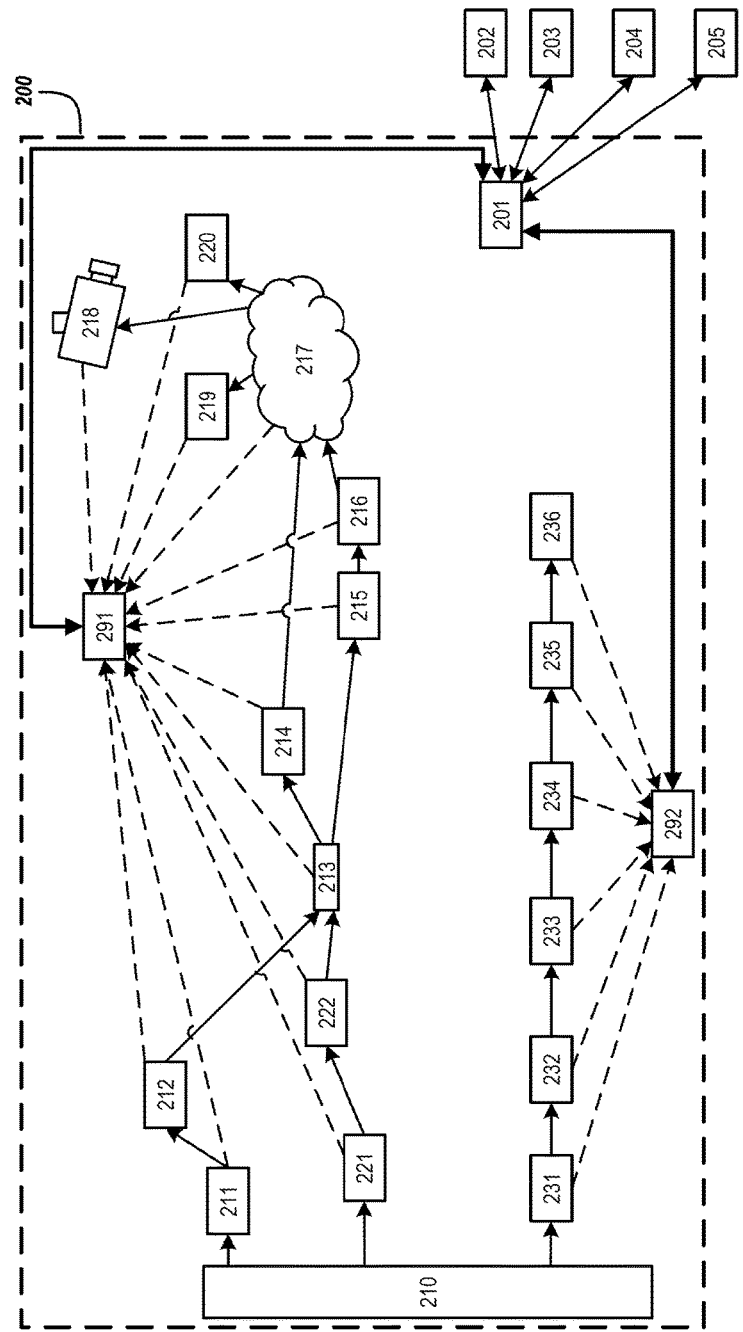
FIG. 2 illustrates a conceptual diagram of an architecture for monitoring a set of cloud components and proactively initiating a region switch based on monitoring results, in accordance with some embodiments.

FIG. 2 illustrates a conceptual diagram of an architecture for monitoring a set of cloud components and proactively initiating a region switch based on monitoring results, in accordance with some embodiments. A load balancer 210 within a first data center region 200 may direct network traffic to an endpoint of a first endpoint 211 or a second endpoint 221, where an endpoint may be or include any type of endpoint capable of receiving data from a client device, such as a deployed containerized application, a virtual machine, a serverless function, a virtual private network, etc. The first endpoint 211 may include a deployed container that receives data from the load balancer 210 and sends this data to an internal hop component 212. The internal hop component 212 may then send this data to a router 213, where the router 213 may then send this data to a first web application server 214.

The second endpoint 221 may include a serverless function that then transfers data received from the load balancer 210 to a second internal hop component 222. The second internal hop component 222 may transfer this received data to the router 213. The router 213 may send data to one or more web application servers, such as a first web application server 214 or a second web application server 215. In some embodiments, the router 213 may determine what data to send based on where the data came from. For example, the router 213 may send data provided by the first endpoint 211 to the first web application server 214 and send data provided by the second endpoint 221 to the second web application server 215. Alternatively, some embodiments may send data provided by both the first endpoint 211 and the second endpoint 221 to both the first web application server 214 and the second web application server 215. Furthermore, the second web application server 215 may send received data to a mainframe server component 216. The first web application server 214 and the mainframe server component 216 may both send data to an external network 217. In some embodiments, the external network 217 may also be in communication with a camera 218, a physical measurement sensor 219, and an external web server 220.

Some embodiments may obtain logs of a first application and a second application, where the first application may be or include the first endpoint 211, and where the second application may be or include the second endpoint 221. Some embodiments use the logs to determine that the router 213 is shared by both the first application and the second application and, in response, determine a first set of applications as including the first application and the second application. Some embodiments may then identify a first cluster of components as including the various infrastructure components, devices, and sensors 211-222, where the first cluster of components is associated with the first set of applications and used to execute the first set of applications. Some embodiments may monitor the first cluster of components representing the various infrastructure components, devices, and sensors 211-222 using a first distributed monitor 291.

The first distributed monitor 291 may actively track device health information data at one or more endpoints. The first distributed monitor 291 may also intermittently or continuously probe, scan, or otherwise information from downstream components and interconnected systems to report changes back to a first region failover engine 201. The first distributed monitor 291 may treat different components differently based on a messaging rate of the respective component and the type of information being provided by the respective component. For example, the first distributed monitor 291 may passively receive messages from the first endpoint 211 while sending probing messages to the second endpoint 221 at a probing rate, where the probing rate may include one of various types of probing rates, such as a rate faster than 1 message per second, 1 message per minute, 1 message per hour, etc.

The first distributed monitor 291 may provide failure indications for intermittently used components that cause a zone-switching operation or region-switching operation. For example, if the router 213 is an intermittently used component, the first distributed monitor 291 may send a probing message to the router 213 and receive a failure message or receive no message. In response, the first distributed monitor 291 may report, to the first region failover engine 201, a failure indication that identifies or is otherwise associated with the router 213. As discussed elsewhere in this disclosure, the first region failover engine 201 may proactively cause a zone-switching or region-switching operation in response to the failure indication associated with the router 213. Alternatively, or additionally, the first distributed monitor 291 may report, to the first region failover engine 201, failure messages or other types of warning messages to the first region failover engine 201 for more actively used components. For example, the first endpoint 211 may be an actively used component, where an actively used component is defined as a component that is provided with data at a rate greater than a rate threshold. In some embodiments, the first distributed monitor 291 may scan network traffic data associated with the first endpoint 211 and report, to the first endpoint 211, a detected failure to process incoming data or receive incoming data.

The first data center region 200 also includes a third endpoint 231, where the third endpoint 231 may be or include an application program interface (API) of a third web server 232. The load balancer 210 may send data to the third endpoint 231, where the third endpoint 231 may then send the received data to the third web server 232. The third web server 232 may then send this data to a messaging component 233, where the messaging component 233 may then send this data or data derived from this data to a peering component 234. The peering component 234 may then send this data or data derived from this data to a fourth web server 235. The fourth web server 235 may then send this data or data derived from this data to a database 236.

Some embodiments may determine that a third deployed application is represented by, uses, or is otherwise associated with the third endpoint 231. Some embodiments may collect logs associated with the third deployed application and determine that the third deployed application does not share any components with other applications. Some embodiments may then identify a second cluster of components as including the infrastructure components, devices, and sensors 231-236, where the second cluster of components is associated with the third deployed application. Some embodiments may monitor the infrastructure components, devices, and sensors 231-236 using a second distributed monitor 292. Furthermore, the second distributed monitor 292 may perform reporting and probing operations similar to those described for the first distributed monitor 291 with respect to probing and scanning the infrastructure components, devices, and sensors 231-236.

As described above, the first distributed monitor 291 and the second distributed monitor 292 may both communicate with the first region failover engine 201. The first region failover engine 201 may receive messages from the first distributed monitor 291 or the second distributed monitor 292 indicating a health status of one or more components and perform operations to evaluate or otherwise process data in the incoming messages to predict the occurrence or likelihood of one or more failure events that would require a zone-switching or region-switching operation. The first region failover engine 201 may receive real-time notification of component failures or other types of warning messages, such as a warning message that a set of expected image data was not received or a warning message that object recognition data derived from collected image data does not include one or more expected objects.

The first region failover engine 201 may implement a prediction model, such as a machine learning model or a statistical model, to predict the likelihood of a failure event based on data provided by the first distributed monitor 291 and the second distributed monitor 292. A machine learning model may include various types of models, such as a neural network model. For example, some embodiments may use a recurrent neural network as part of a prediction model to predict the one or more likelihoods of one or more types of events. In some embodiments, the first region failover engine 201 may cause an appropriate response based on the one or more likelihoods. For example, the first region failover engine 201 may generate alarms for monitoring systems, administration users, etc. Alternatively, or additionally, the first region failover engine 201 may also activate one or more traffic routing subsystems to find a new data center zone or new data center region for a traffic-switching operation.

The first region failover engine 201 may communicate with a second region failover engine 202, a third region failover engine 203, a fourth region failover engine 204, and a fifth region failover engine 205 to receive infrastructure information about other data center regions corresponding with the region failover engines 202-205. In some embodiments, the region failover engines 202-205 can each broadcast information indicating the health of devices in their respective data center regions. Based on the device health information provided by the region failover engines 202-205, some embodiments may then select one or more of the other data center regions as the destination data center region for a region-switching operation. For example, some embodiments may select the data center region associated with the second region failover engine 202 for use as a destination data center region based on a determination that the second region failover engine 202 reports the least latency and does not report any component failures relevant to the applications being transferred to the second region failover engine 202.

Figure 3:
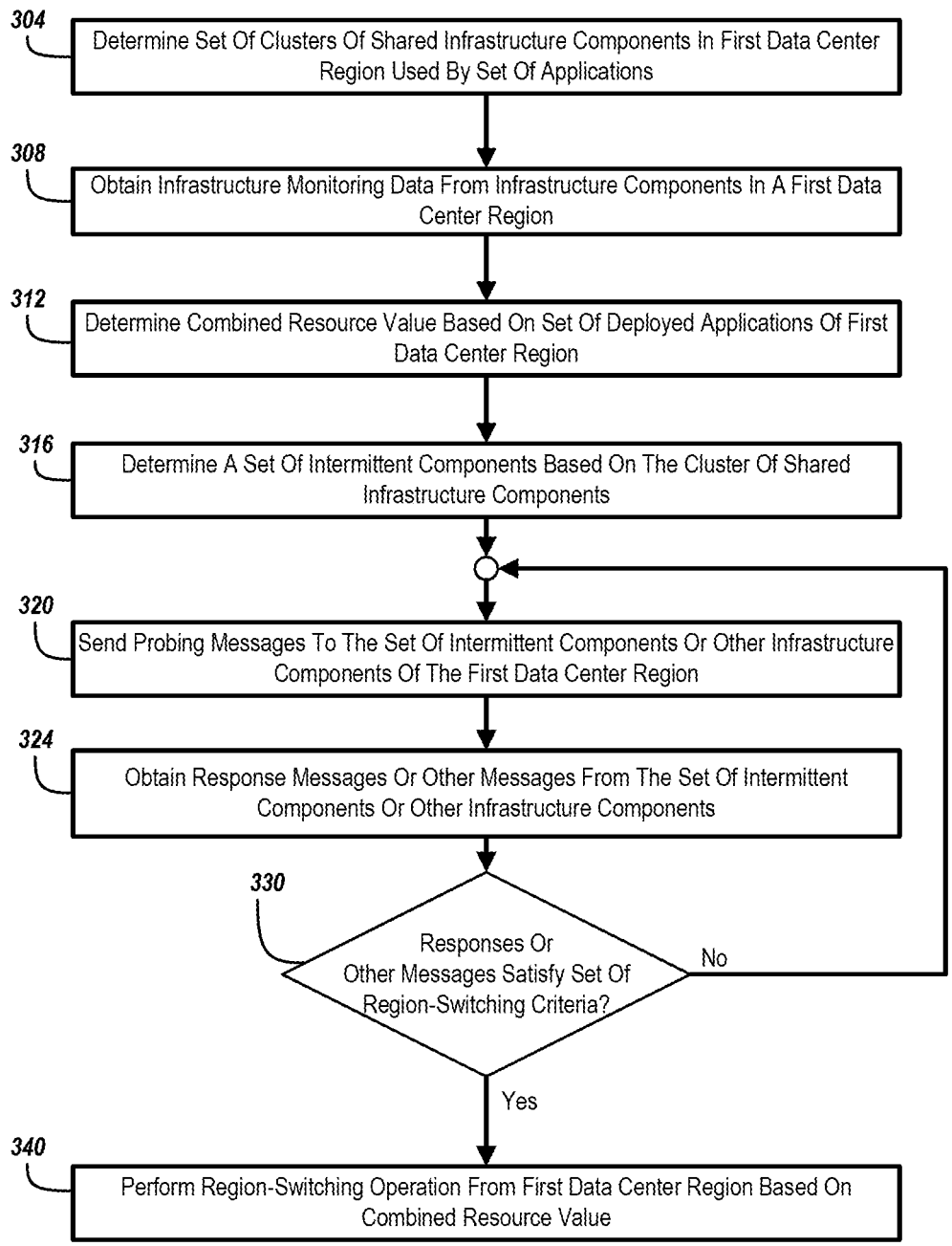
FIG. 3 is a flowchart of a process for initializing a set of monitors for a set of applications and performing a region switch based on the monitoring results, in accordance with one or more embodiments.

FIG. 3 is a flowchart of a process 300 for initializing a set of monitors for a set of applications and performing a region switch based on the monitoring results, in accordance with one or more embodiments. Some embodiments may determine a cluster of shared infrastructure components in a first data center region used by a set of applications, as indicated by block 304. A web application may rely on multiple infrastructure components to operate appropriately. When multiple applications operate in a cloud environment, significant efficiencies may be gained by operating these multiple applications with shared infrastructure resources. Some embodiments may engage with environments in which a set of applications are executing in a cloud environment that uses a set of shared components to operate the set of applications.

Some embodiments may select a set of deployed applications and then determine shared infrastructure resources based on the selection of the set of deployed applications. For example, some embodiments may select a set of deployed applications based on container architecture, such as by selecting the set of deployed applications based on a shared orchestration master node. In some embodiments, the shared orchestration master node is shared between the set of deployed applications or otherwise manages the set of deployed applications. For example, a shared orchestration master node may control a cluster of other nodes used to execute multiple web applications, such as a Kubernetes master node or a Docker Swarm manager node. Alternatively, as described elsewhere in this disclosure, some embodiments may first determine shared infrastructure resources and then determine sets of related applications based on the shared infrastructure resources. For example, some embodiments may obtain infrastructure monitoring data in the form of logs and determine one or more shared infrastructure components that are used by multiple applications based on a detection of matching identifiers in the logs.

Some embodiments obtain infrastructure monitoring data from the cluster of infrastructure components in the first data center region, as indicated by block 308. Infrastructure monitoring data may include performance data indicating information such as processor utilization, network bandwidth, memory utilization, and disk input/output (I/O) information. Performance data may also include application monitoring information, which may include application response times, database transaction rates, measured error rates, and measurements of user responses. In some embodiments, application monitoring information may include application-specific information, such as information indicating when a specific process to be performed by the application is completed or the state of the application at one or more points in time. In some embodiments, the infrastructure monitoring data may include network monitoring data, such as logs of network activity indicating network traffic and network performance. Networking monitoring data may include values indicating data transfer rates, latency, packet loss, or network anomalies and timestamps associated with these values. In some embodiments, infrastructure monitoring data may also include data related to system security, such as detected unauthorized access attempts, detected data breaches, or detected vulnerabilities in a data system.

Some embodiments may perform monitoring using a system-specific monitoring application for the infrastructure in a data center region. For example, some embodiments may implement a Linux bash script to perform one or more monitoring operations described in this disclosure. Alternatively, or additionally, some embodiments may use cloud-native monitoring tools associated with a cloud platform being used. For example, some embodiments may use program instructions that use one or more APIs of Amazon CloudWatch, Google Stackdriver, or Microsoft Azure Monitor to monitor cloud infrastructure.

Some embodiments may determine a combined resource value based on a set of deployed applications, as indicated by block 312. As described elsewhere, some embodiments may select a set of deployed applications based on a combined resource value may be a value used to prepare a new data center zone to handle the set of deployed applications. As described elsewhere in this disclosure, some embodiments may initiate a region switch from a first data center region to a second data center region, where such initiation may require that new components or other types of resources be provisioned or that existing resources in the second data center region be scaled to an appropriate amount. Some embodiments may perform such initiations by using a set of combined resource values that indicate a type of resource to be provisioned or scaled or an amount of that type of resource to be provisioned or scaled.

Some embodiments may determine a combined resource value associated with preparing a data center region to handle data transfer or data storage requirements for a set of applications. Determining data-related resource values may include determining a total amount of memory indicated for a set of deployed applications, a throughput for the database, a reading or writing speed for a database, etc. To determine a data storage-related combined resource value for a set of applications, some embodiments may determine a total amount of memory used by the set of applications, use performance data related to read and write times of one or more databases used by the set of applications, use performance data related to measured throughput values, etc. For example, some embodiments may determine a combined resource value based on a total amount of memory used to store data used by the set of applications by first determining this total amount of memory and then increase this amount by an additional percentage for use as a combined resource value. Alternatively, or additionally, some embodiments may obtain performance data in the form by obtaining a set of measurements of read or write speeds of a set of databases used by set of applications and determine a measure of central tendency (e.g., a mean average, a median, a mode, etc.) of the read or write speeds. Some embodiments may then use the measure of central tendency as a combined resource value.

Alternatively, or additionally, some embodiments may also determine a set of environment configuration parameters to be used in a new region. For example, before switching a set of applications from a first region to a second region, some embodiments may determine a set of database URLs and a set of API endpoints used by the set of applications. When configuring or updating an environment in the second region, some embodiments may replicate this set of database URLs or set of API endpoints. Alternatively, or additionally, some embodiments may modify this set of database URLs or set of API endpoints.

Some embodiments may determine a set of intermittent components based on the cluster of shared infrastructure components, as indicated by block 316. Some embodiments may determine that a candidate component is intermittent based on a determination that one or more types of target activities of the candidate component occurring is infrequent based on an activity gap threshold. The activity gap threshold may be one set of various types of durations, such as a value less than or equal to one second, a value less than or equal to one minute, a value less than or equal to one hour, a value less than or equal to 24 hours, a value less than or equal to one week, etc. For example, some embodiments may determine that response in frequency is an indicator of an intermittent infrastructure component and determine that a candidate component is an intermittent component based on a determination that the duration representing an activity gap between a first response and a second response from the candidate component exceeds an activity gap threshold. Alternatively, some embodiments may determine, based on an activity log, that a candidate component is used to receive data at least once every minute and, in response, determine that the candidate component is not classified as an intermittent component. Furthermore, some embodiments may use a measure of central tendency with respect to durations between target activity events performed by the candidate component and compare the measure of central tendency with the activity gap threshold to determine whether the candidate component is an intermittent component. For example, some embodiments may collect the response times of a backup database and determine that the backup database is an intermittent component based on a determination that the mean average duration between different backup events is greater than the activity gap threshold.

Some embodiments may send probing messages to the set of intermittent components or other infrastructure components of the first data center region, as indicated by block 320. Some embodiments may probe intermittent components instead of relying on operations normally performed by intermittent components to execute one or more instructions associated with a deployed application. For example, some embodiments may probe intermittent components with a set of pings to obtain responses from the intermittent components, where the responses may indicate one or more aspects of device health related to the intermittent components. Alternatively, or additionally, some embodiments may send other types of messages to an intermittent component, such as a web request or an application-specific message that can be interpreted by an application or service executing on the intermittent component.

Some embodiments may also send probing messages to one or more other components that would not be classified as an intermittent component. For example, even if a candidate component is indicated to respond to messages at a rate greater than a rate threshold indicating an intermittent component, some embodiments may send probing messages to the candidate component. As described elsewhere in this disclosure, the probing messages sent to this candidate component may cause the candidate component to send a response that includes data that would normally not be collected from usual measurements of network activity related to the candidate component.

Some embodiments may send probing messages to devices that would not normally be considered as part of a conventional cloud infrastructure. For example, some embodiments may send probing messages to physical measurement sensors, cameras or image sensors, or services associated with third-party data sources. As described elsewhere in this disclosure, some embodiments may then obtain responses to these probing messages from these other types of devices or services for use in predicting the likelihood of a failure event requiring a region switch.

Some embodiments may change active monitoring operations when monitoring intermittent infrastructure components based on a detected increase in network activity. For example, some embodiments may detect that an application is being used more frequently or detect that a user activity metric associated with an application (e.g., a number of concurrent users of the application, a data throughput) is greater than a utilization threshold. Some embodiments may then increase a probing rate from sending one probing message per minute to sending one probing message per second. Alternatively, or additionally, some embodiments may reduce the probing rate that a set of probing messages are sent based on a detected reduction in network activity associated with one or more applications.

Some embodiments may obtain response messages or other messages from the set of intermittent components or other infrastructure components, as indicated by block 324. Some embodiments may obtain response messages from resource components that are provided in response to probing messages sent from a component monitor. For example, after a component monitoring application pings a device as a probe, some embodiments may receive, from a service operating on the device, a corresponding response to the ping, where the corresponding response may indicate the functionality of the device. In some embodiments, a response may include more specific information about the device or service executing on the device, such as CPU utilization, memory utilization, disk I/O, storage capacity, bandwidth use, CPU allocation, memory size, power status, temperature, system uptime, etc.

Some embodiments may include sensors that are designed to fail with specific types of activities that correlate with unconventional failure events. For example, some embodiments may include image sensors or physical measurement sensors that indicate a state of an environment. Some embodiments may then receive messages from the image sensors or physical measurement sensors indicating a visual state or physical measurement. In some embodiments these messages may indicate a likelihood of a failure event that would not be detected using conventional infrastructure failure signals. For example, some embodiments may receive a message from a camera system indicating a failure to receive or process image data, where the image data may include still image data or video data. Alternatively, or additionally, some embodiments may receive data indicating the state of an electrical system (e.g., a circuit breaker activation), a temperature change, a humidity change, etc. As described elsewhere in this disclosure, some embodiments may then initiate a region-switching operation based on the image data, physical sensor data, or data derived from image data or physical sensor data.

Some embodiments may also obtain information from third-party data sources. For example, some embodiments may obtain weather-related information indicating that an area is likely to receive a severe weather event such as a hurricane or tornado. Alternatively, or additionally, some embodiments may obtain information about a local physical energy infrastructure, where such information may indicate that a power outage has occurred. As described elsewhere in this disclosure, some embodiments may use information obtained from one or more third-party data sources to determine whether or not to initiate a region-switching operation.

Some embodiments may determine whether the responses or other messages satisfy a set of region-switching criteria, as indicated by block 330. Some embodiments may use a rule-based system to determine whether or not to switch regions. For example, some embodiments may implement a rules engine that obtains messages from intermittent components and other infrastructure components and determines whether the set of messages satisfies one or more region-switching rules. A region-switching rule may include a rule that, if a particular database, a particular server, a particular service, or particular application indicates a failure, a region-hopping management application will initiate a region-switching operation.

Some embodiments may provide the responses or other messages to a machine learning model to generate a set of predictions. For example, some embodiments may provide, to a neural network, indications of functionality or failures corresponding with messages provided from multiple infrastructure components. Furthermore, some embodiments may provide a time series of signals to a prediction model to provide more accurate predictions for a likelihood of a failure that would necessitate a region-switching operation. As described elsewhere in this disclosure, operations to switch data center regions as opposed to operations to switch data center zones within a same region may be more complex and require types of configurations described in this disclosure that would not be necessary for switching in the same zone. Furthermore, the types of failures that would necessitate such region-switching operations may be of a more catastrophic nature.

Some embodiments may use a machine learning model or another prediction model to predict the likelihood of such catastrophic failures before such catastrophic failures occur. A catastrophic failures event may include one or more of various types of failure events, such as a network outage, a server connection failure, a firewall-related failure, a database connection failure, application deployment failure, an application unavailability issue, an issue related to a heavy latency, a memory issue (e.g., an amount of memory available at a particular time), a throttling issue, a physical device failure (e.g., a failed camera, a failed user interface terminal, etc.) an IO connectivity issue, an application-specific error, etc. For example, some embodiments may use a transformer-based neural network and provide a history of responses from intermittent devices and non-intermittent devices to the transformer-based neural network. The transformer-based neural network may then provide a set of predictions for one or more failures, where some embodiments may provide the likelihood of one or more different types of failures. Depending on the likelihood for a sub-class of failures, some embodiments may determine that a region-switching operation is more warranted than a simple same-region, zone-switching operation. Furthermore, various types of outputs may be provided by a prediction model.

In some embodiments, a prediction model for a failure event may provide a number indicating the likelihood of a non-specific failure event occurring in a pre-determined duration of time. For example, a prediction may be provided with the statuses of multiple devices and back-end services over a duration of time and output 57% to indicate that the likelihood of a failure requiring a region-switching operation is equal to 57%. Alternatively, or additionally, some embodiments may provide an expected time or expected time range during which a failure event may occur. For example, a prediction may output "[51, 90]" in association with "database connection failure" to indicate that a failure event titled "database connection failure" is estimated to occur between 51 seconds and 90 seconds. Some embodiments may use the timing of failure events to select a future time for a region-switching operation.

Some embodiments may determine a switching time at which to initiate a region-switching operation to a second data center region based on information about the status of the second data center region and a predicted failure event. For example, some embodiments may predict that a failure event will occur in the range of 60 seconds to 4 minutes. In response, some embodiments may search for a destination data center region for a region-switching operation based on a predicted status of 60 seconds instead of at the current time. By using a predicted time and predicted status for other regions, some embodiments may better account for predictable changes to region statuses when choosing a destination data center region.

Some embodiments may obtain application data indicating the importance of data backups, where the absence of such backups may be considered a failure event even if a primary database is functional. Some embodiments receive indication that the backup has failed and, in response, initiate a switching event from a first data center region to a second data center region. For example, some embodiments may obtain a set of messages that include a warning indicating a failure event that a backup database is not appropriately storing data. In some embodiments, the backup database may be a required backup database that is set by internal programmed policies or externally enforced compliance requirements. Some embodiments may determine that, as a result of receiving the warning, the set of region-switching criteria is satisfied.

Some embodiments may detect device failures and cross-reference the device failures with available backups in the same data center region before initiating a region-switching operation. For example, some embodiments may determine multiple results, where a first result may indicate whether a set of region-switching criteria is satisfied, and where a second result may indicate whether a set of zone-switching criteria is satisfied. In some embodiments, the set of zone-switching criteria may be satisfied even if the set of region-switching criteria is not satisfied. For example, some embodiments may determine that a first data center zone in a first data center region is indicated to be suffering from one or more failure events. Some embodiments may then determine, based on a set of performance metrics associated with other data center zones within the same data center region, whether these other data center zones can satisfy infrastructure resource needs of the set of applications. Some embodiments may determine that the set of applications can be properly executed in a second data center zone in the same data center region and, in response, prepare the second data center zone to host the set of applications and direct traffic to the second data center zone. Alternatively, some embodiments may determine that the other data center zones in the same data center region do not satisfy at least one requirement, such as a compute or storage requirement indicated by a combined resource value, and, in response, initiate a region switch to a different data center region.

When predicting the likelihood of a system failure, some embodiments may obtain a set of failure messages associated with client devices and use the set of failure messages as additional inputs for a prediction model. In many cases, the use of client device information may be helpful to predict a geographically localized event that could impact the performance of a data center region, such as an earthquake or power outage. Some embodiments may train a machine learning model to associate the inability to communicate with a plurality of client devices in a geographic location near the data center region with an increased likelihood of a system failure.

Some embodiments may detect large numbers of failures on client devices without receiving a message that explicitly indicates a component failure. Furthermore, some embodiments may detect one or more component failures without relying on active traffic for the one or more components (e.g., detecting a failure from an infrastructure component that is not being actively used by probing the failed component). Some embodiments may detect patterns of changes and generate a new warning condition to initiate region switching to reduce the risk of client-side failures. Some embodiments may generate or update a prediction by training a prediction model based on a history of failure messages from client devices and corresponding activity related to a data center region that is configured to receive data from the client devices. For example, some embodiments may obtain a set of failure messages from a plurality of client devices that provides data to at least one application executing on infrastructure components of a data center region. Some embodiments may then organize the set of failure messages into subsets of failure messages and a corresponding detected modification to the state of a data center region. Furthermore, some embodiments may filter the client device messages to client devices indicated to be within a predetermined geographical range of the servers of the data center regions. For example, some embodiments may restrict the client device messages used for training operations to be client device messages from client devices within 5 kilometers (km) of the geographical location of a server of the data center region. Similarly, when providing a prediction model with client device data, some embodiments may filter the client device data such that messages from client devices within the predetermined geographical range are provided as inputs to the prediction model.

Some embodiments may detect new patterns in infrastructure component status data associated with one or more failure events, such as a zone-switching failover event or a client failure event. For example, some embodiments may obtain a history of failure messages from client devices, a set of occurrence times associated with the history of failure messages, and a corresponding history of responses from infrastructure components. For each respective failure message of the set of failure messages, some embodiments may determine a sub-history of responses that were obtained prior to receiving the respective failure message. For example, a set of client devices may provide a first failure message at a first time, a second failure message at a second time, and a third failure message at a third time. Some embodiments may obtain a response history of component responses during this same time and segment the response history into a set of segmented response histories. The set of segmented response histories may include a first set of responses obtained before the first time, a second set of responses obtained before the second time and after the first time, and a third set of responses obtained before the third time and after the second time. Some embodiments may then provide each of the respective sub-histories to a pattern-detecting machine learning model to output one or more response patterns, where a response pattern represents the combination of messages obtained from infrastructure components. Some embodiments may then update the prediction model to indicate a failure in the event that a response pattern is detected.

Some embodiments may segment the messages into subsets of failure messages and a corresponding detected modification to the state of a data center region. Furthermore, some embodiments may filter the client device messages to client devices indicated to be within a predetermined geographical range of the servers of the data center regions. For example, some embodiments may restrict the client device messages used for training operations to be client device messages from client devices within 5 kilometers (km) of the geographical location of a server of the data center region. Similarly, when providing a prediction model with client device data, some embodiments may filter the client device data such that messages from client devices within the predetermined geographical range are provided as inputs to the prediction model.

In response to a determination that the set of responses or other messages satisfies the set of region-switching criteria, operations of the process 300 may proceed to operations described for block 340. Otherwise, operations of the process 300 may proceed to operations described for block 320.

Some embodiments may perform a region-switching operation from the first data center region based on the combined resource value, as indicated by block 340. When performing a region-switching operation, some embodiments may perform operations described further below for the process 400. Some embodiments may perform a region-switching operation to transfer network traffic for a set of applications operating in a first data center region by first selecting a destination data center region from a set of data center regions. Some embodiments may then provision or otherwise reserve the resources in the destination data center region that are necessary to execute the set of applications in the destination data center region, where one or more resources is provisioned based on a combined resource value. For example, if a set of combined resource values indicates a database type and an indicated amount of memory for three different web applications, some embodiments may provision a single database of that database type having the indicated amount of memory in a destination data center region. Some embodiments may then redirect network traffic for the three web applications to the destination data center region. Furthermore, it should be understood that some embodiments may perform a region-switching operation without relying on a combined resource value. For example, some embodiments may perform a region switching operation may provision resources of a new data center region on a per-application basis without first determining a combined resource value or otherwise determining possible redundancies in the resources being provisioned.

Figure 4:
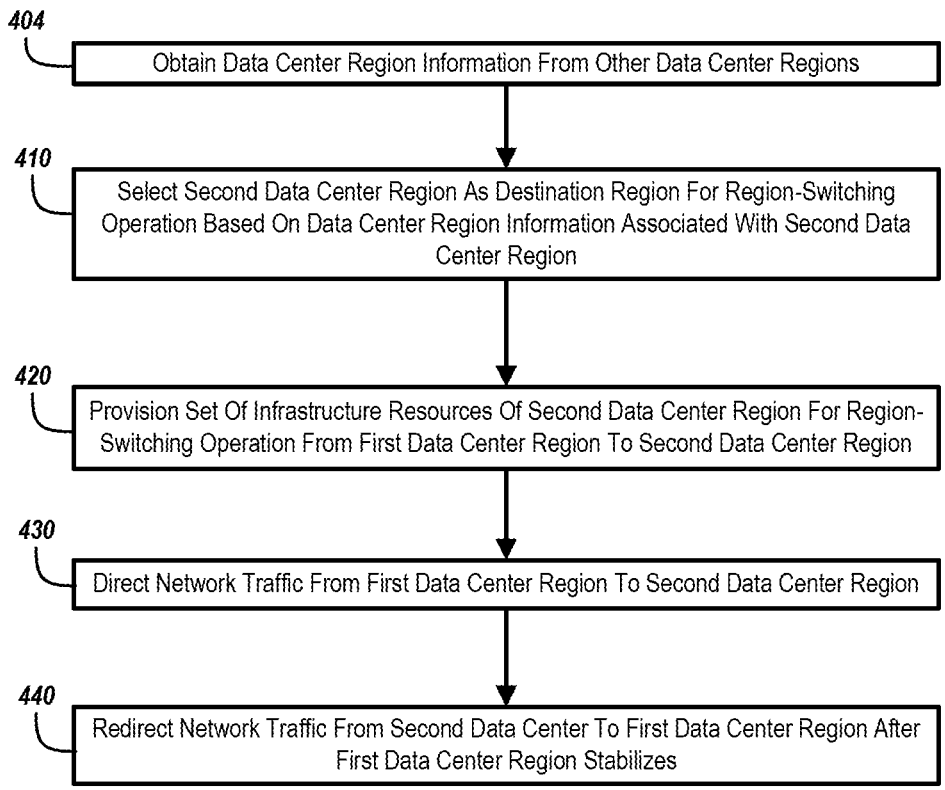
FIG. 4 is a flowchart a process for performing a region-switching operation, in accordance with one or more embodiments The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

FIG. 4 is a flowchart a process 400 for performing a region-switching operation, in accordance with one or more embodiments Some embodiments may obtain data center region information from other data center regions, as indicated by block 404. Some embodiments may broadcast data center information to a set of other data center regions or obtain broadcasted data center information from the multiple data center regions. Alternatively, some embodiments may directly send a request to one or more regions of the set of other data center regions and obtain data center information in response to the request. In some embodiments, this information may be used to determine which data center region to use as a destination data center region for a region-switching operation. Some embodiments may obtain cluster-specific requirements and broadcast associated data center zone performance metrics for each region. For example, some embodiments may broadcast a set of performance metrics related to various data centers and zones within the various data centers. The set of performance metrics may include indications of device health, latency, system downtime, price, available infrastructure resources, etc. For example, some embodiments may broadcast or obtain broadcasts indicating latencies associated with different data center regions or data center zones within the data center regions. As described elsewhere in this disclosure, some embodiments may then select a data center region or even a specific zone of that data center region based on the broadcasted latency. Furthermore, other types of information may be provided by other regions indicating region status or related to region status. For example, some embodiments may broadcast or receive broadcasts about a predicted status of a data center region in the future, such as broadcasting a predicted device health status of the data center region thirty seconds in the future, sixty seconds in the future, or some other time in the future.

In some embodiments, a message indicating a status of a data center region may indicate that the data center region is healthy based on a determination that all components of the data center region are healthy. For example, a monitoring application may determine that all components of the zones of a first data center region are healthy and, in response, broadcast a message indicating that the first data center region is healthy. Alternatively, or additionally, a message indicating a status of a data center region may indicate that the data center region is healthy based on a determination that a subset of components of the data center region are healthy, where the subset of components is indicated to be essential to the data center region. For example, a monitoring application may determine that a first subset of components of the zones of a second data center region are healthy and that a second subset of components of the zones of the second data center region has failed. The monitoring application may then determine that the first subset of components is indicated to be essential or that the second subset of components are not indicated to be non-essential and, in response, broadcast a message indicating that the second data center region is healthy.

In some embodiments, a monitoring engine may broadcast or otherwise send a request for data center region information that includes one or more indicated requirements. Some embodiments may generate a performance requirement based on one or more performance metrics associated with a set of deployed applications detected using operations described for block 304. For example, some embodiments may determine a required latency by estimating a maximum permitted latency amongst the set of deployed applications based on network performance metrics of the set of deployed applications. Some embodiments may then determine a combined resource value by predicting a combined resource value that would satisfy the performance requirement while also satisfying one or more configuration parameters or other types of configuration data associated with the set of deployed applications. Some embodiments may then broadcast a request for data center region information that includes the combined resource value, where a subset of available data center regions responds to the request after a determination by each respective responding data center region that the responding data center region is capable of allocating resources based on the combined resource value. For example, after broadcasting a combined resource value associated with a required network latency, some embodiments may obtain a set of network latency measurements from a plurality of data center regions. As described elsewhere in this disclosure, some embodiments may select the second data center region of the plurality of data center regions based on the set of network latency measurements (e.g., by selecting the data center region with the least network latency measurements).

It should be understood that, while some embodiments may obtain data center region information from other data center regions in response to a determination that a set of responses or other messages satisfies the set of region-switching criteria, other embodiments are possible. Some embodiments may obtain data center region information independently of whether the set of region-switching criteria is satisfied. For example, some embodiments may receive broadcasts of data center region information from other data centers at scheduled intervals (e.g., at least once every minute, at least once every hour, at least once every day, or at least once every N interval of time, where N may be another interval of time greater than 24 hours). Furthermore, some embodiments may skip obtaining data center region information from other data center regions in response to a determination that the set of region-switching criteria is satisfied. Instead, in response to the determination that the set of region-switching criteria, some embodiments may select a second data center region as a destination region, as described elsewhere in this disclosure.

Some embodiments may select a second data center region as a destination region for a region-switching operation based on the data center region information associated with the second data center region, as indicated by block 410. Selecting a second region as a destination region for a region-switching operation may include selecting the second region from a plurality of possible regions. Some embodiments may select a region based on selecting a minimum or maximum value of a set of performance metrics, such as a latency, an amount of an available resource type, a set of device health statuses, a geographic closeness with a first data center region from which network traffic is being directed, etc. Furthermore, some embodiments may enforce additional selection requirements, such as a requirement that a set of latency measurements of at least one data center zone of a selected data center region satisfies a maximum latency threshold (e.g., a value less than or equal to 50 millisecond (ms), a value less than or equal to 100 ms, a value less than or equal to 301 ms, a value less than or equal to 500 ms, a value less than or equal to some other time threshold, etc.). For example, some embodiments may determine whether any average latency of a set of latency measurements of network activity of each data center zone of a candidate data center region satisfies a maximum latency threshold of 301 ms. Based on a determination that none of the average latencies satisfies 301 ms, some embodiments may discard the candidate data center region from further consideration as a destination data center region. Alternatively, based on a determination that an average latency of a first zone is less than 301 ms, some embodiments may keep the candidate data center region for further consideration as a destination data center region.

As another example, some embodiments may require that the device health statuses of at least one zone or all zones of a destination data center region indicate a healthy state. For example, some embodiments may filter a set of candidate data center regions into a first subset of candidate data center regions based on a determination that each respective data center region of the first subset of candidate data center regions is indicated as healthy. Some embodiments may then select a second candidate data center region from the first subset of candidate data center regions based on a determination that the second candidate data center region has the lowest latency from amongst the first subset of candidate data center regions. Some embodiments may then use the second candidate data center region as a destination region for a region-switching operation.

Alternatively, or additionally, some embodiments may select an optimal region based on a specific set of critical components (e.g., availability of a specific type of database, minimum performance thresholds associated with accessing the specific type of database, requirements to satisfy data privacy regulations, etc.). Some embodiments may then select a data center region or otherwise restrict the number of candidate data center regions for consideration in a region-switching operation to data center regions capable of satisfying the set of critical component requirements. For example, some embodiments may select a data center region as a destination region based on data compliance requirements related to data encryption requirements and other critical component requirements. In some embodiments, a data compliance requirement may include a requirement that a set of applications update or otherwise communicate with an encrypted database to store privacy data or a requirement that data stay within a defined geographic region. For example, some embodiments may obtain an indication that data stored in a first region must satisfy a set of data privacy regulations and that all data must be stored on physical machines within a defined geographic region. In response, some embodiments may select a data center region based on a determination that the data center region is physically located within the defined geographic region and includes at least one identified component that satisfies a critical component requirement. It should be understood that various other types of critical component requirements may be enforced. For example, some embodiments may enforce a requirement that a destination data center region be capable of receiving a set of image data from a set of cameras or physical measurement sensor within a predefined latency range.

Some embodiments may determine that a second data center region includes a database or other storage component that is already being used as a backup storage component for at least one of the applications operating in a first data center region. In response, some embodiments may select a second data center region for use as a destination data center region of a region-switching operation. For example, some embodiments may determine that data stored in a first object storage database of a first data center region "REGION1" is backed up in a second object storage database of a second data center region "REGION2." In response, some embodiments may select the second data center region "REGION2" as a destination data center region.

Some embodiments may predict a region for switching clusters and pre-emptively migrate dependencies and backup data to the other regions in preparation for switching. By at least partially preparing a data center region for a switching event before the region is actually selected, some embodiments may reduce the likelihood of a failure event during a switch. Some embodiments may obtain performance metrics associated with a set of data center zones of a candidate data center region that could later be used as a destination data center region. Some embodiments may then associate the candidate data center region with a set of deployed applications based on the performance metrics. Some embodiments may then migrate dependency data to the second data center region based on the association between the second data center region and the set of deployed applications. For example, some embodiments may determine that a client-facing application requires a first service application and that a candidate data center region may be a viable destination data center region based on latency values broadcasted by zones of the candidate data center region. Some embodiments may then provision or otherwise initialize the first service application in one or more zones of the candidate data center region.

Some embodiments may provision a set of infrastructure resources of the second data center region for a region-switching operation from the first data center region to the second data center region, as indicated by block 420. In some embodiments, the first data center region may be an origin data center region from which network traffic is to be transferred from in a region-switching operation. For example, the first data center region may be similar to or the same as the first data center region described for block 304. Provisioning a resource may include determining the type of resource to be provisioned and executing one or more sets of instructions based on the type of resource to be provisioned. Some embodiments may receive instructions to provision resources in a new region in which no private network exists. In response, some embodiments may execute one or more scripts to provision a new virtual private cloud or other type of network space in the new region. Alternatively, or additionally, some embodiments may use an existing provisioned cloud network or network space.

Some embodiments may provision compute resources such as a virtual machine, container, or serverless function. For example, some embodiments may provision one or more virtual machines to act as virtual servers to run applications or services. Alternatively, or additionally, some embodiments may provision containers in lieu of full virtual machines to execute one or more applications or services. Alternatively, or additionally, some embodiments may provision serverless functions by configuring one or more aspects of the serverless function based on configuration parameters of the first region. When provisioning a compute resource, some embodiments may use a combined resource value indicating one or more shared resources between multiple applications to determine an appropriate configuration parameter for the compute resource. For example, some embodiments may determine a combined resource value indicating CPU limits being used to execute multiple applications, where the CPU limits may be less than the CPU limits that would have been used for the individual applications. Some embodiments may then use this combined resource value as a configuration parameter or determine a new configuration parameter based on this combined resource value (e.g., multiplying the combined resource value by 1.5 or another scaling value, adding an additional value to the combined resource value, etc.).

Some embodiments may provision storage resources, such as object storage resources, block storage resources, or database storage resources. Furthermore, when provisioning storage resources, some embodiments may use a combined resource value to determine one or more amounts of storage memory to provision. For example, some embodiments may have previously determined that a set of deployed applications uses 5 TB in a secured database in a first data center region and, in response, provision at least 5 TB in a second data center region to prepare for a transfer of network traffic from the first data center region to the second data center region.

Some embodiments may provision other types of infrastructure resources, such as load balancers, various types of services (e.g., encryption services), fully managed database services, etc. For example, some embodiments may detect the use of a first managed SQL database in a first data center region and, as a part of preparing a second data center region to act in lieu of the first data center region, provision a second managed SQL database in the second data center region. Furthermore, implementation of scripts or program code used to effectuate a region-switching operation may include parameters to indicate special security or backup operations with respect to storage resources.

Some embodiments may direct network traffic from the first data center region to the second data center region, as indicated by block 430. Some embodiments may implement routing changes that may redirect network traffic that was previously sent to the first data center region to the second data center region. For example, some embodiments may update a Domain Name System (DNS) routing scheme such that network traffic that was previously directed to a first data center region is now redirected to a second data center region. Some embodiments may override previously configured routing schemes, such as geolocation routing schemes, geo-proximity routing schemes, or latency-based routing schemes. Alternatively, some embodiments may implement more complex routing schemes or implement cross-region load balancers capable of redirecting network traffic based on configuration parameters or messages indicating whether a set of region-switching criteria is satisfied.

Additionally, some embodiments may perform other modifications or perform other operations when initiating a region-switching operation from a first data center region to a second data center region. Some embodiments may modify existing routing schemes that rely on automated load balancing features to deactivate load balancing features that would have directed network traffic to a region indicated to experience imminent failure. Furthermore, some embodiments may modify DNS traffic management policies originally configured for a first region and a corresponding set of zones for the first region to adapt to the naming conventions of the destination data center region. For example, some embodiments may receive a data table indicating a set of equivalencies between a first set of zones in the first data center region and a second set of zones in the second data center region. Some embodiments may then modify a configuration file or other implementation of a zone-switching policy to use the names and addresses of the second set of zones in the second data center region.

Some embodiments may redirect network traffic from the second data center region to the first data center region after the first data center region stabilizes, as indicated by block 440. In some embodiments, after network traffic is switched to a destination region, the network traffic remains directed to the destination region for a certain amount of time while an origin region stabilizes. In some embodiments, a region may be determined to be stabilized when components of the region that had previously sent failure messages are detected to be no longer sending failure messages. In some embodiments, network traffic can be switched back to an origin region in an incremental fashion to return the network traffic back to an original state. For example, some embodiments may obtain a second set of messages from intermittent components or other components in the origin region. For example, some embodiments may obtain a second set of responses from an intermittently used backup database and a virtual machine management system on a weekly schedule in an origin region. Some embodiments may then provide the set of messages to a prediction model to determine a set of prediction values and determine whether the set of prediction values satisfies a set of region-switching criteria. For example, some embodiments may provide a set of messages to a prediction model and receive a prediction value "0.041" indicating a predicted 4.1% likelihood for a failure that would require a future region switch, where a prediction value greater than 5% would satisfy a region-switching criterion. Alternatively, some embodiments may determine whether a set of responses satisfies a set of region-switching criteria without first providing the set of responses to a prediction model (e.g., determining whether the set of responses satisfies a rule-based decision system).

Based on a determination that the second set of messages no longer satisfies a set of region-switching criteria, some embodiments may initiate operations to return network traffic to its original region in a piecemeal fashion. For example, some embodiments may redirect network traffic associated with a first application back to the original region. Some embodiments may then determine whether the redirected network traffic causes a change in the predicted likelihood of failure such that the predicted likelihood of failure again satisfies the set of region-switching criteria or otherwise causes a set of messages to satisfy a set of region-switching criteria. For example, some embodiments may receive a third set of messages from a set of infrastructure components of the origin region after redirecting traffic back to the origin region. Some embodiments may then determine that this third set of messages also does not satisfy the set of region-switching criteria and, in response, redirect an additional amount of network traffic of a second application to the origin region. Some embodiments may then perform such operations for the portion of network traffic corresponding with other applications that was directed to a destination region until all of the network traffic that was redirected from an origin region to a destination region is redirected back to the origin region.

Some embodiments may assign priority scores to the applications in a cluster of a first data center region and, after region-switching the applications to a second data center region, selectively return them back to their original region based on those priority scores. Some embodiments may assign priority scores based on one or more network traffic metrics indicating the location of users within a geographical region corresponding with the first data center region. For example, some embodiments may include a map that associates network traffic from client devices with different data center regions based on the physical proximities between the data center location and the client devices. Some embodiments may assign a greater priority score to a first application in comparison to a lesser priority score to a second application based on a determination that a greater number of users of the first application are within the geographic region assigned to the first data center region. Some embodiments may then perform a region-switching operation that directs the network traffic of both the first application and the second application to a second data center region in response to a determination that a set of region-switching criteria was satisfied. After performing the region-switching operation, some embodiments may then first select network traffic for the first application to redirect back to the first data center region instead of network traffic for the second application based on the priority scores.

Some embodiments may better prepare a new data center region for transfer based on a scaling history of an original data center region. Some embodiments may generate a resource scaling parameter based on a history of configuration parameters of a first data center zone of the first data center region. For example, some embodiments may obtain a history of provisioned computing resources for a first application in a first zone of a first data center region, where the history includes a history of a set of configuration parameters used during resource provisioning. In some embodiments, the history of provisioned computing resources may indicate a growing amount of provisioned CPU or memory resources over time. Some embodiments may generate a model of the resource growth to determine a resource scaling parameter usable to predict a future amount of the resource that will be required by the set of applications executing in a destination data center region. Some embodiments may then use the resource scaling parameter to predict an amount or type of a resource that will be required to properly handle the application after network traffic of the application is directed to the destination data center region.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIGS. 1-2 could be used to perform one or more of the operations described in relation to FIGS. 3-4.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. For example, some embodiments may perform operations of block 430 without performing operations of block 440. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: obtaining a set of responses from the set of intermittent components associated with the set of probing messages; determining whether the set of responses satisfies a set of region-switching criteria; and in response to a determination that the set of responses satisfies the set of region-switching criteria, provisioning a second set of infrastructure resources of a second data center region.
2. A method comprising: determining a set of shared components of a first data center region based on monitoring data; determining a set of intermittent components associated with the set of shared components based on the monitoring data and an activity gap threshold; probing the set of intermittent components with a set of probing messages; obtaining a set of responses from the set of intermittent components associated with the set of probing messages; determining a combined resource value based on performance data associated with a set of deployed applications; determining whether the set of responses satisfies a set of region-switching criteria by providing the set of responses to a prediction model; and in response to a determination that the set of responses satisfies the set of region-switching criteria, provisioning a second set of infrastructure resources of a second data center region based on the combined resource value.
3. The method of embodiment 2, wherein a set of deployed applications is executing on the set of shared components.
4. A method comprising: determining a cluster of shared infrastructure components of a first data center region based on infrastructure monitoring data associated with a plurality of deployed applications, wherein a set of deployed applications of the plurality of deployed applications is executing on the cluster of shared infrastructure components, and wherein the first data center region comprises the cluster of shared infrastructure components; determining a set of intermittent components in communication with the cluster of shared infrastructure components based on activity gaps indicated by the infrastructure monitoring data and an activity gap threshold; probing the set of intermittent components with a set of probing messages without using messages generated by the set of deployed applications to communicate with the set of intermittent components; obtaining a set of responses from the set of intermittent components associated with the set of probing messages; generating a set of predictions indicating a likelihood of a latency failure or a resource availability failure by providing a prediction model with the set of responses; determining whether the set of predictions satisfies a set of region-switching criteria; and in response to a determination that the set of responses satisfies the set of region-switching criteria, initializing a region switch to a second data center region by (i) determining a combined resource value based on performance data associated with the set of deployed applications and (ii) provisioning a second set of infrastructure resources of the second data center region based on the combined resource value.
5. A method comprising: determining a set of shared components of a first data center region based on infrastructure monitoring data, wherein a set of deployed applications is executing on the set of shared components; determining a set of intermittent components in communication with the set of shared components based on the infrastructure monitoring data and an activity gap threshold; probing the set of intermittent components with a set of probing messages without using messages generated by the set of deployed applications; obtaining a set of responses from the set of intermittent components associated with the set of probing messages; determining a combined resource value based on performance data associated with the set of deployed applications; determining a result indicating that the set of responses satisfies a set of region-switching criteria by providing the set of responses to a prediction model; and in response to the result, provisioning a second set of infrastructure resources of a second data center region based on the combined resource value.
6. The method of any of embodiments 1 to 5, wherein the result is a first result, wherein the set of responses is a first set of responses, further comprising: directing network traffic of the set of deployed applications to the second data center region; obtaining a second set of responses from the set of intermittent components; determining a second result indicating that the second set of responses does not satisfy the set of region-switching criteria; based on the second result, redirecting network traffic of a first application of the set of deployed applications to the first data center region; obtaining a third set of responses from the set of intermittent components; determining a third result indicating that the third set of responses does not satisfy the set of region-switching criteria; and based on the third result, redirecting network traffic of a second application of the set of deployed applications to the first data center region.

7. The method of embodiment 6, further comprising: determining a first priority score for the first application based on a first network traffic metric of the first application indicating a first number of users within a geographical region corresponding to the first data center region; determining a second priority score for the second application based on a second network traffic metric of the second application indicating a second number of users within the geographical region, wherein redirecting the network traffic of the first application comprises selecting the network traffic of the first application for re-direction in lieu of the network traffic of the second application based on a comparison between the first priority score and the second priority score.

8. The method of any of embodiments 1 to 7, further comprising broadcasting a set of performance metrics of a data center zone of the second data center region to a set of other data center regions, wherein: the set of other data center regions comprises the first data center region; and the set of performance metrics comprises a latency, wherein provisioning the second set of infrastructure resources of the second data center region comprises selecting the second data center region based on the latency.

9. The method of any of embodiments 1 to 8, wherein a plurality of data center regions comprises the second data center region, and wherein provisioning the second set of infrastructure resources comprises: generating a performance requirement based on performance metrics associated with the set of deployed applications; predicting the combined resource value based on the performance requirement and configuration data associated with the set of deployed applications; obtaining a set of network latency measurements corresponding to the plurality of data center regions; and selecting the second data center region of the plurality of data center regions based on a comparison between the combined resource value and the set of network latency measurements.

10. The method of any of embodiments 1 to 9, further comprising obtaining an indication that a first application of the set of deployed applications communicates with a first database, wherein: obtaining the set of responses comprises obtaining a warning that a backup database of the first database is not storing data; and determining the result indicating that the set of responses satisfies the set of region-switching criteria comprises determining that the warning satisfies a region-switching criterion of the set of region-switching criteria.

11. The method of any of embodiments 1 to 10, wherein the result is a first result, and wherein provisioning the second set of infrastructure resources comprises: determining a second result indicating that performance metrics associated with a set of data center zones in the first data center region do not satisfy the combined resource value; and provisioning the second set of infrastructure resources based on the second result.

12. The method of any of embodiments 1 to 11, wherein probing the set of intermittent components with the set of probing messages comprises periodically probing the set of intermittent components with the set of probing messages at a probing rate, further comprising: detecting an increase in network activity associated with an application of the set of deployed applications; and increasing the probing rate in response to the detection of the increase in network activity.

13. The method of any of embodiments 1 to 12, wherein the result is a first result, and wherein provisioning the second set of infrastructure resources of the second data center region comprises: identifying a set of critical component requirements based on application data associated with the set of deployed applications; and determining a second result indicating that the set of critical component requirements is satisfied based on identified resources of the second data center region.

14. The method of any of embodiments 1 to 13, the operations further comprising: obtaining a set of failure messages from a plurality of client devices indicated to be providing data to at least one application of the set of deployed applications; segmenting a response history into a set of segmented response histories based on a set of occurrence times associated with the set of failure messages; providing, as an input, the set of segmented response histories to a neural network to obtain a response pattern; and updating the set of region-switching criteria based on the response pattern.

15. The method of any of embodiments 1 to 14, wherein: the set of responses comprises a warning message indicating a failure to receive image data; and determining whether the set of responses satisfies the set of region-switching criteria comprises providing a machine learning model with the warning message.

16. The method of any of embodiments 1 to 15, the operations further comprising selecting the set of deployed applications based on a shared orchestration master node between the set of deployed applications.

17. The method of any of embodiments 1 to 16, wherein provisioning the second set of infrastructure resources comprises: determining whether a database of the second data center region is being used to store data for at least one application of the set of deployed applications; and selecting the second data center region based on a determination that the second data center region is being used to store data for the at least one application.

18. The method of any of embodiments 1 to 17, wherein determining whether the set of responses satisfies the set of region-switching criteria comprises determining whether a set of latency measurements satisfies a maximum latency threshold.

19. The method of any of embodiments 1 to 18, the operations further comprising: associating the second data center region with the set of deployed applications based on performance metrics associated with a set of data center zones of the second data center region; and migrating dependency data to the second data center region based on the association between the second data center region and the set of deployed applications.

20. The method of any of embodiments 1 to 19, wherein provisioning the second set of infrastructure resources comprises: generating a resource scaling parameter based on a set of configuration parameters of a first data center zone of the first data center region; and provisioning the second set of infrastructure resources based on the resource scaling parameter.

21. The method of any of embodiments 1 to 20, the operations further comprising: directing network traffic of the set of deployed applications to the second data center region; and sequentially redirecting network traffic of the set of deployed applications back to the first data center region by, for each respective application of the set of deployed applications: obtaining an additional respective set of responses; determining whether the additional respective set of responses satisfies the set of region-switching criteria; in response to a determination that the additional respective set of responses does not satisfy the set of region-switching criteria, redirecting network traffic of the respective application to the first data center region.

22. The method of any of embodiments 1 to 21, wherein: the set of shared components comprises a second set of components different from the set of intermittent components, wherein each respective component of the second set of components is used at least once every minute; the set of responses is a first set of responses; and the operations further comprise: obtaining a second set of responses indicating activity for the second set of components; and determining whether the first set of responses satisfies the set of region-switching criteria comprises determining whether the first set of responses and the second set of responses satisfies the set of region-switching criteria.

23. One or more tangible, non-transitory, machine-readable media storing instructions that, when executed by a set of processors, cause the set of processors to effectuate operations comprising those of any of embodiments 1 to 22.

24. A system comprising: a set of processors and a set of media storing computer program instructions that, when executed by the set of processors, cause the set of processors to effectuate operations comprising those of any of embodiments 1 to 22.

What is claimed is:

1. A system for increasing application resilience by proactively switching data center regions based on detected failures in shared intermittent components, the system comprising one or more memory devices programmed with instructions that, when executed by one or more processors, cause operations comprising:
   determining a cluster of shared infrastructure components of a first data center region based on infrastructure monitoring data associated with a plurality of deployed applications, wherein a set of deployed applications of the plurality of deployed applications is executing on the cluster of shared infrastructure components, and wherein the first data center region comprises the cluster of shared infrastructure components;
   determining a set of intermittent components in communication with the cluster of shared infrastructure components based on activity gaps indicated by the infrastructure monitoring data and an activity gap threshold;
   probing the set of intermittent components with a set of probing messages without using messages generated by the set of deployed applications to communicate with the set of intermittent components;
   obtaining a set of responses from the set of intermittent components associated with the set of probing messages;
   determining a combined resource value based on performance data associated with the set of deployed applications by:
      generating a performance requirement based on performance metrics associated with the set of deployed applications; and
      predicting the combined resource value based on the performance requirement and configuration data associated with the set of deployed applications;
   generating a set of predictions indicating a likelihood of a latency failure or a resource availability failure by providing a prediction model with the set of responses;
   determining whether the set of predictions satisfies a set of region-switching criteria; and
   in response to a determination that the set of responses satisfies the set of region-switching criteria based on the set of predictions, initializing a region switch to a second data center region by (i) determining a combined resource value based on performance data associated with the set of deployed applications and (ii) provisioning a second set of infrastructure resources of the second data center region based on the combined resource value.

2. A method comprising:
   determining a set of shared components of a first data center region based on infrastructure monitoring data, wherein a set of deployed applications is executing on the set of shared components;
   determining a set of intermittent components in communication with the set of shared components based on the infrastructure monitoring data and an activity gap threshold;
   probing the set of intermittent components with a set of probing messages without using messages generated by the set of deployed applications;
   obtaining a set of responses from the set of intermittent components associated with the set of probing messages;
   determining a combined resource value based on performance data associated with the set of deployed applications by:
      generating a performance requirement based on performance metrics associated with the set of deployed applications; and
      predicting the combined resource value based on the performance requirement and configuration data associated with the set of deployed applications;
   determining a result indicating that the set of responses satisfies a set of region-switching criteria by providing the set of responses to a prediction model to generate a set of predictions indicating a likelihood of a latency failure or a resource availability failure; and
   in response to the result, provisioning a second set of infrastructure resources of a second data center region based on the combined resource value and the result.

3. The method of claim 2, wherein the result is a first result, wherein the set of responses is a first set of responses, further comprising:
   directing network traffic of the set of deployed applications to the second data center region;
   obtaining a second set of responses from the set of intermittent components;
   determining a second result indicating that the second set of responses does not satisfy the set of region-switching criteria;
   based on the second result, redirecting network traffic of a first application of the set of deployed applications to the first data center region;
   obtaining a third set of responses from the set of intermittent components;
   determining a third result indicating that the third set of responses does not satisfy the set of region-switching criteria; and
   based on the third result, redirecting network traffic of a second application of the set of deployed applications to the first data center region.

4. The method of claim 3, further comprising:
   determining a first priority score for the first application based on a first network traffic metric of the first application indicating a first number of users within a geographical region corresponding to the first data center region;
   determining a second priority score for the second application based on a second network traffic metric of the second application indicating a second number of users within the geographical region, wherein redirecting the network traffic of the first application comprises selecting the network traffic of the first application for re-direction in lieu of the network traffic of the second application based on a comparison between the first priority score and the second priority score.

5. The method of claim 2, further comprising broadcasting a set of performance metrics of a data center zone of the second data center region to a set of other data center regions, wherein:
   the set of other data center regions comprises the first data center region; and
   the set of performance metrics comprises a latency, wherein provisioning the second set of infrastructure resources of the second data center region comprises selecting the second data center region based on the latency.

6. The method of claim 2, wherein a plurality of data center regions comprises the second data center region, and wherein provisioning the second set of infrastructure resources comprises:
   obtaining a set of network latency measurements corresponding to the plurality of data center regions; and
   selecting the second data center region of the plurality of data center regions based on a comparison between the combined resource value and the set of network latency measurements.

7. The method of claim 2, further comprising obtaining an indication that a first application of the set of deployed applications communicates with a first database, wherein:
   obtaining the set of responses comprises obtaining a warning that a backup database of the first database is not storing data; and
   determining the result indicating that the set of responses satisfies the set of region-switching criteria comprises determining that the warning satisfies a region-switching criterion of the set of region-switching criteria.

8. The method of claim 2, wherein the result is a first result, and wherein provisioning the second set of infrastructure resources comprises:
   determining a second result indicating that performance metrics associated with a set of data center zones in the first data center region do not satisfy the combined resource value; and
   provisioning the second set of infrastructure resources based on the second result.

9. The method of claim 2, wherein probing the set of intermittent components with the set of probing messages comprises periodically probing the set of intermittent components with the set of probing messages at a probing rate, further comprising:
   detecting an increase in network activity associated with an application of the set of deployed applications; and
   increasing the probing rate in response to the detection of the increase in network activity.

10. The method of claim 2, wherein the result is a first result, and wherein provisioning the second set of infrastructure resources of the second data center region comprises:
    identifying a set of critical component requirements based on application data associated with the set of deployed applications; and
    determining a second result indicating that the set of critical component requirements is satisfied based on identified resources of the second data center region.

11. One or more non-transitory, machine-readable media storing instructions that, when executed by one or more processors, cause the one or more processors to perform operations comprising:
    determining a set of shared components of a first data center region based on monitoring data, wherein a set of deployed applications is executing on the set of shared components;
    determining a set of intermittent components associated with the set of shared components based on the monitoring data and an activity gap threshold;
    probing the set of intermittent components with a set of probing messages;
    obtaining a set of responses from the set of intermittent components associated with the set of probing messages;
    determining a combined resource value based on performance data associated with the set of deployed applications by:
       generating a performance requirement based on performance metrics associated with the set of deployed applications; and
       predicting the combined resource value based on the performance requirement and configuration data associated with the set of deployed applications;
    determining whether the set of responses satisfies a set of region-switching criteria by providing the set of responses to a prediction model to generate a set of predictions indicating a likelihood of a latency failure or a resource availability failure; and
    in response to a determination that the set of responses satisfies the set of region-switching criteria based on the set of predictions, provisioning a second set of infrastructure resources of a second data center region based on the combined resource value.

12. The one or more non-transitory, machine-readable media of claim 11, the operations further comprising:
    obtaining a set of failure messages from a plurality of client devices indicated to be providing data to at least one application of the set of deployed applications;
    segmenting a response history into a set of segmented response histories based on a set of occurrence times associated with the set of failure messages;
    providing, as an input, the set of segmented response histories to a neural network to obtain a response pattern; and
    updating the set of region-switching criteria based on the response pattern.

13. The one or more non-transitory, machine-readable media of claim 11, wherein:
    the set of responses comprises a warning message indicating a failure to receive image data; and
    determining whether the set of responses satisfies the set of region-switching criteria comprises providing a machine learning model with the warning message.

14. The one or more non-transitory, machine-readable media of claim 11, the operations further comprising selecting the set of deployed applications based on a shared orchestration master node between the set of deployed applications.

15. The one or more non-transitory, machine-readable media of claim 11, wherein provisioning the second set of infrastructure resources comprises:
- determining whether a database of the second data center region is being used to store data for at least one application of the set of deployed applications; and
- selecting the second data center region based on a determination that the second data center region is being used to store data for the at least one application.

16. The one or more non-transitory, machine-readable media of claim 11, wherein determining whether the set of responses satisfies the set of region-switching criteria comprises determining whether a set of latency measurements satisfies a maximum latency threshold.

17. The one or more non-transitory, machine-readable media of claim 11, the operations further comprising:
- associating the second data center region with the set of deployed applications based on performance metrics associated with a set of data center zones of the second data center region; and
- migrating dependency data to the second data center region based on the association between the second data center region and the set of deployed applications.

18. The one or more non-transitory, machine-readable media of claim 11, wherein provisioning the second set of infrastructure resources comprises:
- generating a resource scaling parameter based on a set of configuration parameters of a first data center zone of the first data center region; and
- provisioning the second set of infrastructure resources based on the resource scaling parameter.

19. The one or more non-transitory, machine-readable media of claim 11, the operations further comprising:
- directing network traffic of the set of deployed applications to the second data center region; and
- sequentially redirecting network traffic of the set of deployed applications back to the first data center region by, for each respective application of the set of deployed applications:
  - obtaining an additional respective set of responses;
  - determining whether the additional respective set of responses satisfies the set of region-switching criteria;
  - in response to a determination that the additional respective set of responses does not satisfy the set of region-switching criteria, redirecting network traffic of the respective application to the first data center region.

20. The one or more non-transitory, machine-readable media of claim 11, wherein:
- the set of shared components comprises a second set of components different from the set of intermittent components, wherein each respective component of the second set of components is used at least once every minute;
- the set of responses is a first set of responses; and
- the operations further comprise:
  - obtaining a second set of responses indicating activity for the second set of components; and
  - determining whether the first set of responses satisfies the set of region-switching criteria comprises determining whether the first set of responses and the second set of responses satisfies the set of region-switching criteria.

* * * * *